United States Patent [19]

Cyphert et al.

[11] Patent Number: 5,167,457

[45] Date of Patent: Dec. 1, 1992

[54] APPARATUS AND METHOD FOR MARKING ARCUATELY CONFIGURED CHARACTER STRINGS

[75] Inventors: David L. Cyphert, Chillicothe; Thomas E. Cyphert, Kingston, both of Ohio

[73] Assignee: Telesis Controls Corporation, Chillicothe, Ohio

[21] Appl. No.: 613,289

[22] Filed: Nov. 15, 1990

[51] Int. Cl.⁵ ............................................ B41J 2/505
[52] U.S. Cl. ................................... 400/121; 400/127
[58] Field of Search ............... 400/120, 121, 122, 124, 400/126, 127, 130, 131, 134

[56] References Cited

U.S. PATENT DOCUMENTS

| | | | |
|---|---|---|---|
| 3,220,010 | 11/1965 | Hand, Jr. | 346/33 B |
| 3,354,462 | 11/1967 | Russell, III et al. | 346/141 |
| 3,757,349 | 9/1973 | Fulton | 346/49 |
| 3,848,257 | 11/1974 | Moss | 346/49 |
| 4,506,999 | 3/1985 | Robertson | 400/121 |

FOREIGN PATENT DOCUMENTS

| | | | |
|---|---|---|---|
| 208264 | 12/1982 | Japan | 400/121 |
| 14770 | 1/1983 | Japan | 400/121 |
| 97863 | 5/1985 | Japan | 400/121 |
| 667421 | 6/1979 | U.S.S.R. | 400/121 |

OTHER PUBLICATIONS

R. A. Johnson, "Method for Printing Concentric Circles...", *IBM TDB*, vol. 15, No. 3, pp. 974–975, Aug. 1972.

*Primary Examiner*—David A. Wiecking
*Attorney, Agent, or Firm*—Mueller and Smith

[57] ABSTRACT

Apparatus and method are described for developing indentation defined characters formed within pixel matrices having a generally arcuate configuration. The row and column matrices which are formed by the method are characterized in having arcuate rows which are regularly spaced radially from a marker axis. The column components of the pixel matrices are regularly angularly spaced radii emanating from the same marking axis. A rotational marker head is provided carrying marker pin assemblies which are oriented at regular radial angular spacings and in progressively incrementing regular radial distances from the marker axis. As the marker head assembly is rotated, the marker pin assemblies are actuated to form the arcuate character string. The apparatus and method permits the marking of significant character string information on restricted surfaces such as the face of gears and the like.

20 Claims, 12 Drawing Sheets

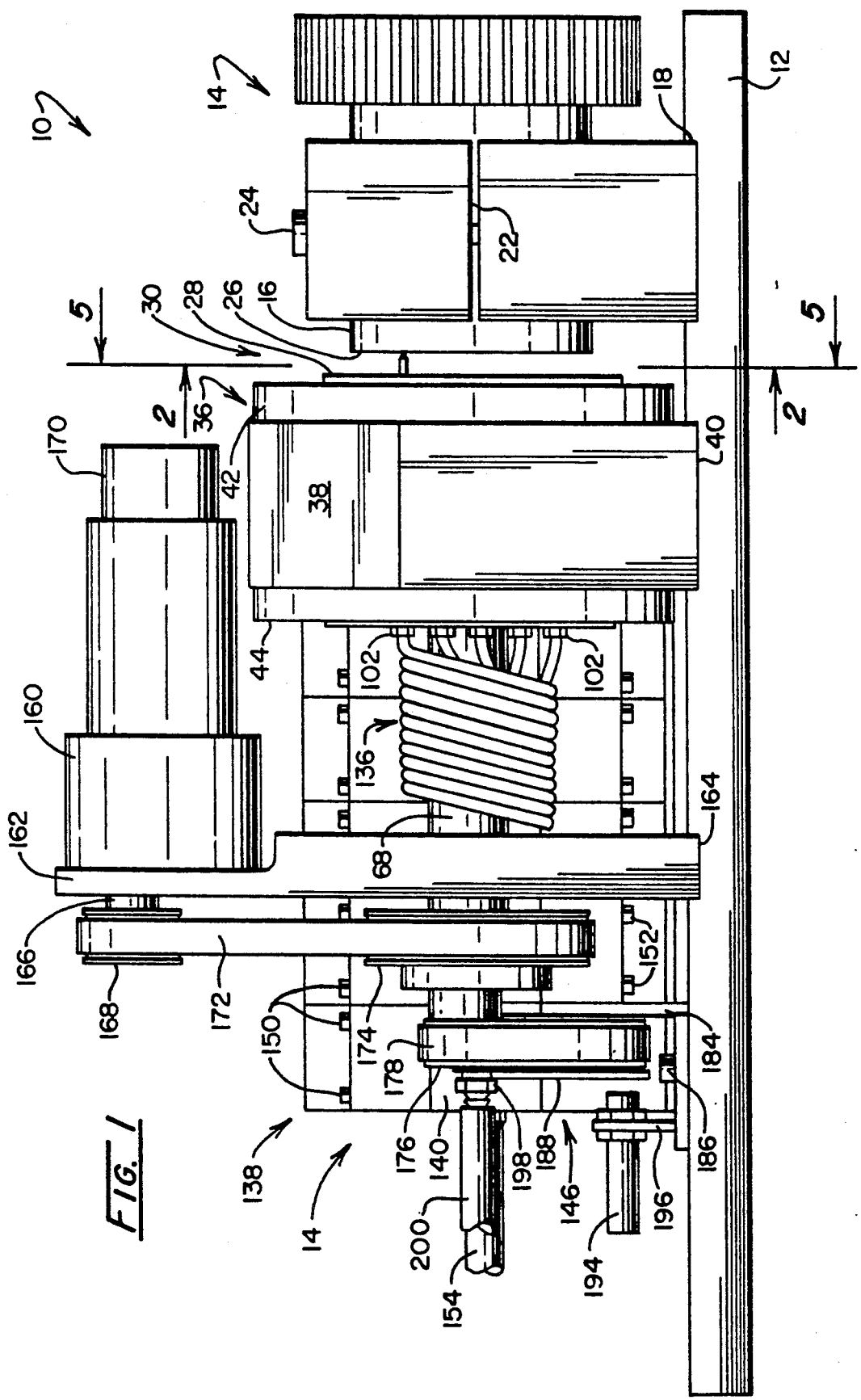

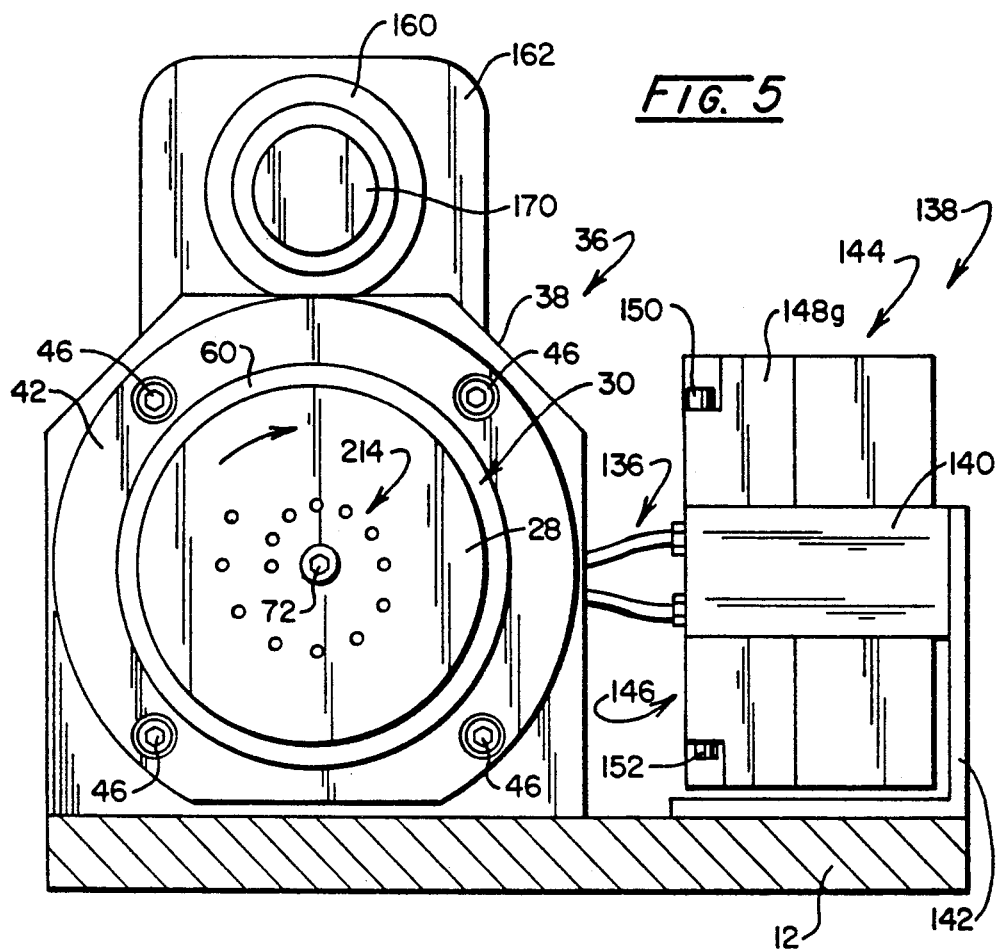
FIG. 5
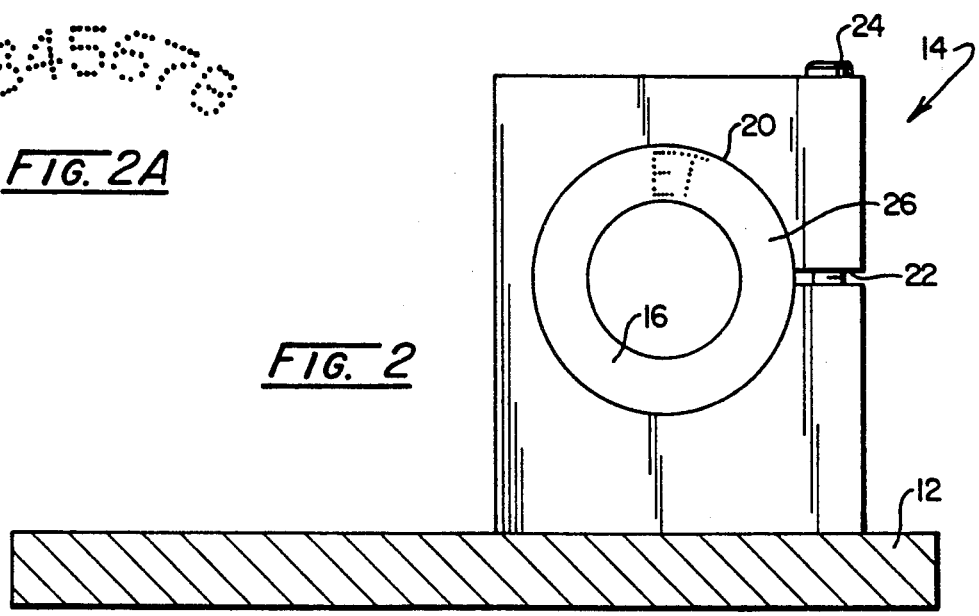
FIG. 2A
FIG. 2

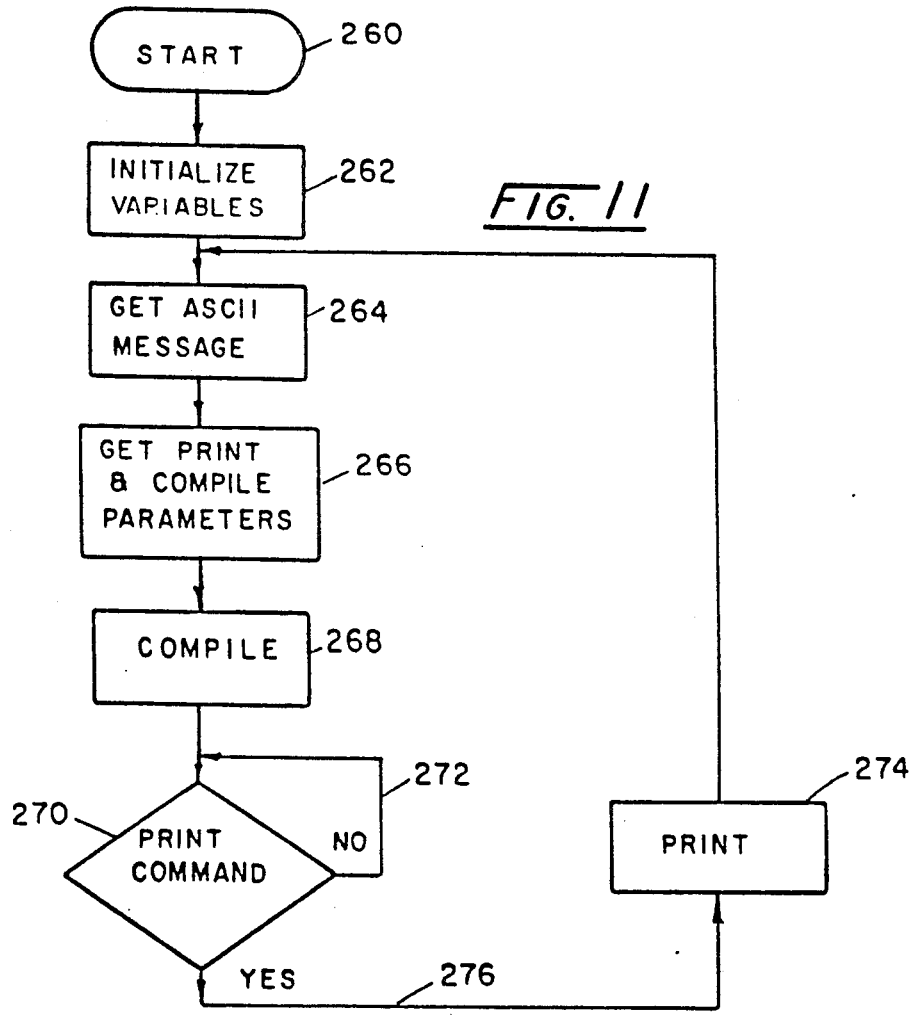

APPARATUS AND METHOD FOR MARKING ARCUATELY CONFIGURED CHARACTER STRINGS

BACKGROUND OF THE INVENTION

As industry has continued to refine and improve production procedures, corresponding requirements have been observed for placing identifying or data related markings upon components of manufactured assemblies. With such marking, the history of a product may be traced throughout the stages of its manufacture. In addition, the marking of components, especially those in complex subassemblies, facilitates replacement and reassembly upon repair. For example, the marking of the constituent components in a transmission enables the repairer to readily substitute worn or otherwise damaged gears or the like with the appropriate replacement parts.

In the recent part, a computer driven dot matrix marking technique has been successfully introduced into the marketplace. Described in U.S. Pat. No. 4,506,999 by Robertson, issued Mar.. 26, 1985, entitled "Program Controlled Pin Matrix Embossing Apparatus", and assigned in common herewith, the marking approach described employs a series of tool steel marker pins which are uniquely driven using a pneumatic floating impact concept to generate man-readable and/or machine readable dot codes. Marketed under the trade designation "PINSTAMP", these devices carry the noted marker pins in a head assembly which is moved in linear fashion relative to the piece being marked to indent a dot or pixel defining permanent message or code into a surface of the marked component. Further, the message characters so created are formed from within a convention pixel matrix rows and columns. The approach enjoys the advantage of providing characters of good legibility as well as permanence. Further, the device provides dot matrix characters of good abrasion resistance, and is advantageously capable of marking upon such surfaces as epoxy coatings. Use of this basic row and column dot matrix character forming device is limited, however, to piece parts which are both accessible and of sizes adequate upon which to form linear character strings.

Robertson, et al, in U.S. Pat. No. 4,808,018, issued Feb. 28, 1989, and assigned in common herewith, describes a dot matrix character impact marking apparatus which is capable of forming messages or arrays of characters within confined regions. With this device, a linear array of marker pins is moved by a carriage in a manner defining an undulating locus of movement. This locus traces the standard row and column matrix within which characters are defined by the pixel position indentations created by the marker pins. The carriage and head containing the marker pins are pivotally driven by a cam to provide vertical movement and by a Geneva mechanism to provide horizontal movement. Pixel positions for the matrices are established by use of a timing disk. Each marking pin within the associated marker head assembly of this portable device is capable of marking more than one complete character for a given traverse of the marker head between its limits of movement. However, use of the impact marking device is also limited to parts with surface geometries suitable for the forming of linear marking arrays.

Robertson, et al., U.S. Pat. No. 5,015,106 issued May 14, 1991 entitled "Marking Apparatus with Multiple Line Capability," assigned in common herewith, describes a dot matrix character impact marking apparatus that advantageously is capable of producing multi-line character arrays of variable size. The multi-line capability is developed through the use of a print head that incorporates two parallel linear arrays of marker pins. An actuator assembly, driven by electric-motor-powered facing cam wheels, urges the marker head assembly along a single plane locus of movement defining a sequence of rows corresponding with the rows of a row-column defined pixel matrix. The locus includes a retrace feature for each row of transverse movement which enhances the quality of character formation. However, this device too is limited to applications wherein a surface of a size sufficient for marking a linear character string is present.

The demonstrated success of the above-noted PINSTAMP based marking device has led to additional demands from the industry for an impact making device capable of forming characters, codes, or messages within a region so confined that a linear array of readable markings would otherwise be limited to only a few characters. Such limited making regions are, for example, encountered with circular workpieces. One approach to marking such circular workpieces has been to form characters on their cylindrically shaped outer edges. However, such techniques are cumbersome and inefficient. For gears, washers, bearing flanges and the like, however, such peripheral marking techniques and marking approaches are barred by the unavailability of a circumferential surface upon which characters may be formed.

Generally, the dot-defined characters for the above systems are formed utilizing a conventional matrix, for example having several parallel, linear rows of five pixels each and five generally perpendicularly disposed parallel columns of seven pixels each. Deviations from this rectangular matrix structure have been considered to potentially detract from the readability of resultant characters.

SUMMARY

The present invention is addressed to apparatus and method for forming indentation defined dot matrix characters and symbols upon surfaces of restricted extent. Marking is carried out in conjunction with a pixel matrix or rows and columns wherein the rows are established as a sequence of radially spaced arcs generated from a marking axis. Correspondingly, pixel locations establishing the columns of the matrix are disposed along angularly spaced radii extending from the same marker axis. Arcuate character strings resulting from the method of marking are readily readable and of generally pleasing appearance. With the method and apparatus, piece parts such as gears and the like heretofore capable of retaining only limited identifying markings, may carry permanent character strings representing significant information.

Another feature of the invention provides apparatus for marking solid material objects at a surface thereof in response to data input with a sequence of indentation defined characters, each within a pixel matrix. The apparatus includes a marker head rotatable about a marking axis and having a confronting portion positionable in spaced adjacency with the surface of an object to be marked, including an array of marker pin assemblies each positioned a unique radial distance from the axis and each located along a unique predetermined radius extending from the axis, each marker pin assembly including a marker pin having an impacting tip drivably movable from the confronting portion into the surface when actuated in response to control signals. A support retaining the marker head for rotational movement about the axis is provided and a drive arrangement is coupled with the marker head for effecting the rotation thereof about the axis to move the marker pin assemblies along unique, mutually spaced arcuate locii represent arcuate rows within a pixel matrix. A control arrangement is provided which is responsive to the data inputs for acquiring print and compile parameters and compiling the data inputs with respect thereto for deriving the control signals to actuate the marker pin assemblies to form characters within the matrix arcuate rows and at column pixel locations of the matrix where each column is represented along a unique radius extending from the axis.

Another feature of the invention provides a method for marking solid material objects at a surface thereof in response to data inputs with an arcuately disposed sequence of indentation defined characters, each within a pixel matrix which comprises the steps of:

providing a marker head having a marking axis and a confronting portion located in spaced adjacency with the surface;

providing an array of marker pins from first to last within the marker head, each positioned a unique radial distance from the marking axis, each located along a predetermined radius extending from the marking axis and having an impacting tip movable from the confronting portion, when actuated, into the surface;

effecting relative rotational motion between the marker head and the surface about the marking axis to effect corresponding relative motion between the marker pin impacting tips and the surface along respective unique arcuate locii representing arcuate rows of the matrix; acquiring print and compile parameters and compiling the data inputs with respect thereto; and actuating the pins in correspondence with the compiled data inputs to form select indentations along the arcuate locii to form characters within the matrix comprised of the arcuate rows and having corresponding columns along the radii extending from the marking axis.

Still another feature of the invention provides apparatus for marking solid material objects at a surface thereof in response to data inputs with a sequence of indentation defined characters, each within a pixel matrix of columns and rows. The apparatus includes a marker head having a marking axis, a confronting portion positionable in spaced adjacency with the surface of an object to be marked, and including an array of marking pin assemblies, each positioned a unique radial distance from the axis and each located along a predetermined unique radius extending from the axis, each marking pin assembly having an impacting tip drivable movable from the confronting portion into the surface in response to control signals. A drive arrangement is provided for effecting relative rotational movement between the marker head and the surface bout the axis to effect corresponding relative motion between the impacting tips and the surface defining unique, mutually spaced arcuate locii representing arcuate rows within a pixel matrix. A control arrangement is responsive to data inputs for acquiring print and compile parameters and compiling the data inputs with respect thereto for deriving the control signals.

Other objects of the invention will, in part, be obvious and will, in part, appear hereinafter.

The invention, accordingly, comprises the apparatus and method possessing the construction, combination of elements, arrangement of parts, and steps which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 1 is a side elevational view of apparatus according to the invention;

FIG. 2 is a sectional view of the apparatus of FIG. 1 taken through the plane 2—2 shown therein;

FIG. 2A is a representation of arcuately disposed numerical characters which may be located on the surface of a piece part to be marked;

FIG. 5 is a sectional view of the apparatus of FIG. 1 taken through the plane 5—5 shown therein;

FIG. 11 is a flow diagram describing the overall program under which the control system operating the apparatus of FIG. 1 performs;

DETAILED DESCRIPTION OF THE INVENTION

Figure 3:
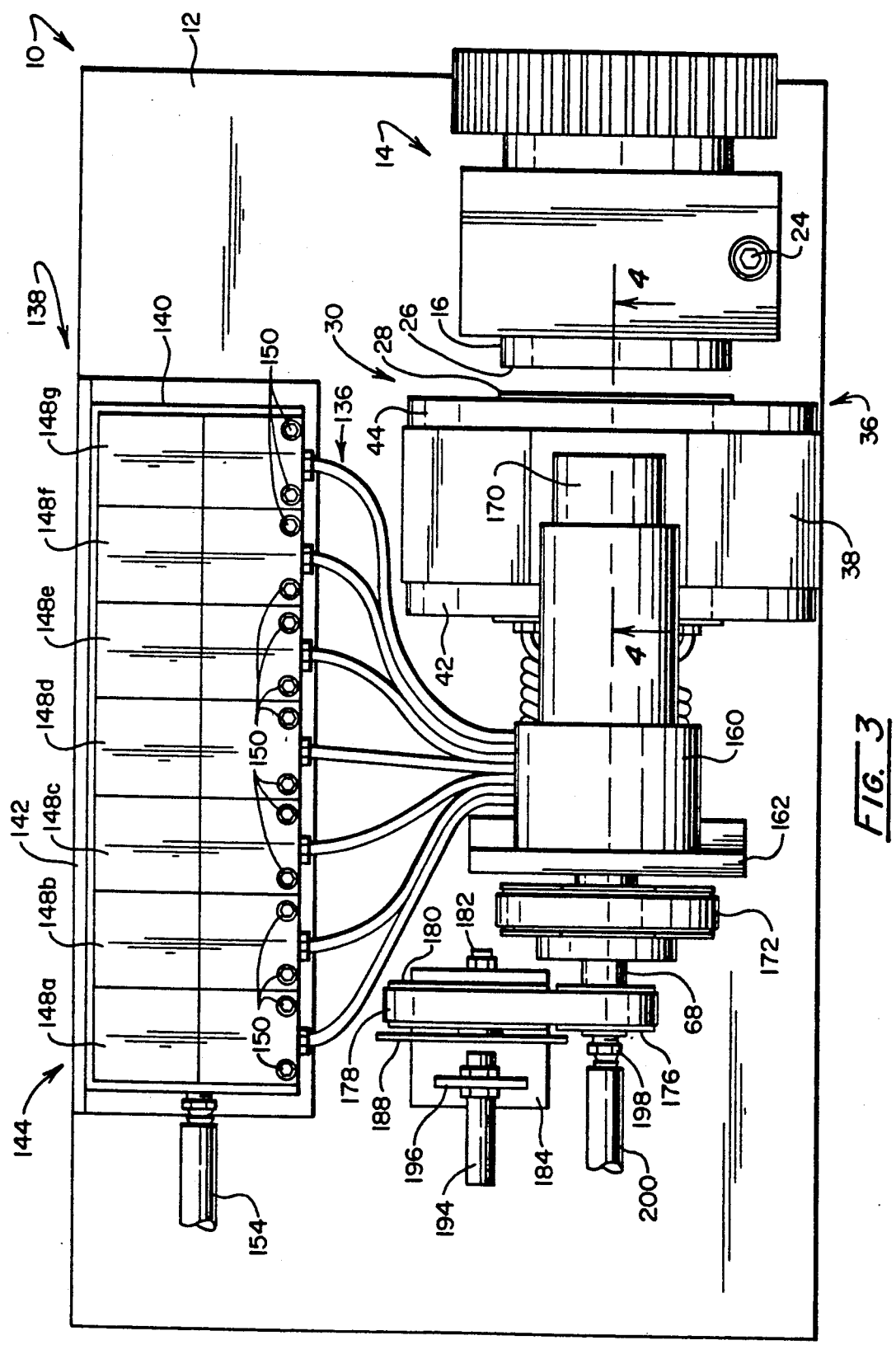
FIG. 3 is a top view of the apparatus of FIG. 1.

The marking approach of the present invention involves the formation of characters utilizing a basic pixel matrix from which character string are developed having a high quality of readability. This matrix is developed by the formation of characters about common axis. Thus, the pixel matrix is one wherein the pixels within rows are developed along a sequence of arc, while pixels evolved in columnar fashion are aligned along radii emanating from that common marking axis. To work with such matrices, a relative motion is called for between the workpiece and the marking head. Thus, the marking head may be rotated about a common marking axis. Preferably, it is the marking head which is so rotated, that marking head carrying a radially disposed array of marker pins.

Referring to FIG. 1, a side orientation of apparatus according to the invention is revealed generally at 10. The apparatus 10 is shown to include a base plate 12 serving to support a sequence of components. At one end of the plate 12 is a working clamp or jib 14 which serves to retain a workpiece having a circular portion suited for marking such as a gear hub, bushing collar or the like in position. Such a gear-type workpiece is represented at 16.

Clamp 14 is seen to be nested within a slot 18 formed within base 12. Looking additionally to FIG. 2, jib 14 is seen to have a circular opening 20 formed therein conforming to that portion of workpiece 16 to be grasped or retained. To carry out this securement, a slot 22 is formed at one side of the clamp 14 extending to the opening 20. A machine screw 24 extends through the upper component of the bifurcate form workpiece 14 to be threadably engaged therewithin across the slot 22. Thus by tightening the screw 24, the opening 20 is constricted to retain workpiece 16.

Returning to FIG. 1, the surface 26 of circular periphery to be marked by the apparatus 10 is seen positioned before the confronting surface or portion 28 of a marker head represented generally at 30.

Figure 4:
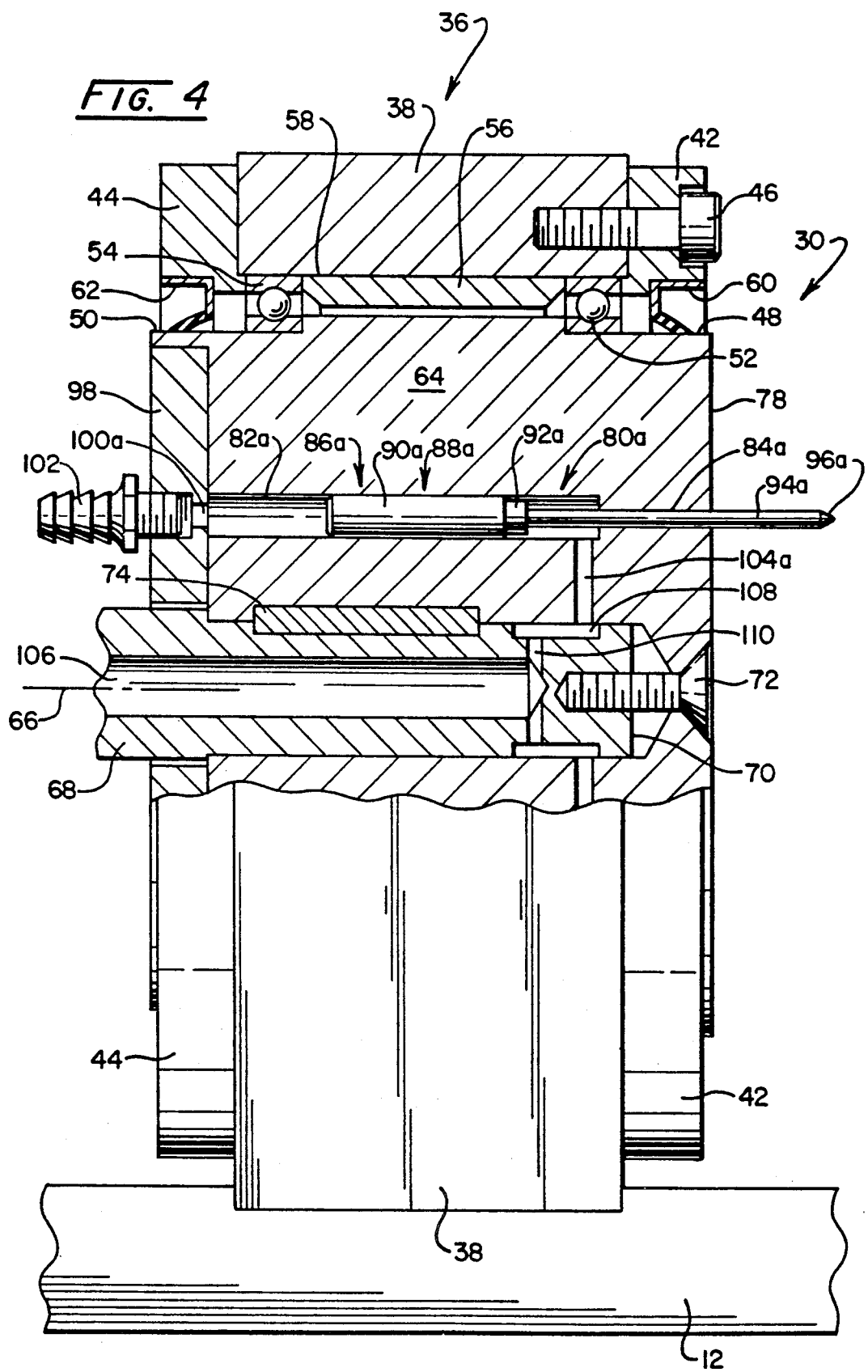
FIG. 4 is a sectional view of the apparatus of FIG. 3 taken through the plane 4—4 shown therein.

FIGS. 1 and 3 reveal that the marker head 30 is retained within a support represented at 36 which includes an upstanding housing 38 mounted within a slot 40 formed within base 12 at either side of which is located a generally ring-shaped bearing retainer as shown at 42 and 44. As seen in FIGS. 4 and 5, the retainers, for example that at 42 are retained in position by machine screws as at 46.

FIG. 4 reveals that marker head 30 is fashioned generally as a solid cylindrical block, with oppositely disposed cylindrical portions thereof as at 48 and 50 being seen to be configured for mounting the internal race of respective relatively larger diameter ball bearings shown respectively at 52 and 54. Bearings 52 and 54 are seen additionally to be positioned adjacent an annular spacer 56 and the assemblage itself is positioned within a cylindrical opening formed within housing 38, an edge of which is seen at 58. Bearings 52 and 54 additionally are retained in position by the earlier-noted bearing retainers 42 and 44. To secure the bearing structures from the incursion of environmental contamination, such as dirt and the like, annular bearing seals are positioned to protect bearings 2 and 54 as seen respectively, at 60 and 62.

Thus configured, the head component 64 of marker head 30 is rotatable within the support 36 about an axis represented at 66. Coaxially disposed with this axis 66 is a drive shaft 68, one end 70 of which is coupled to the head component 64 by a flat head machine screw 72. Component 64 is rotatably driven by the drive shaft 68. To enhance this drivable connection, for example, a keyway may be formed therein for retaining a key as at 74. Within head component 64, there are located one or more arrays of marker pins, one of which is revealed in FIG. 4 in general at 80a. Marker pin 80a is configured to include elongate chamber 82a bored within component 64 in parallel axial relationship with the axis of rotational marker axis 66. The chamber 82a is counterbores at 84a to provide a in supporting bore which extends through the confronting portion or surface 28 of head component 64. Within chamber 82a there is interposed a marker pin represented generally at 88a which comprises a drive portion 90a which extends to a necked down region 92a and thence supports, in coaxial fashion a shaft portion 94a terminating in an impacting tip 96a. Pin 86a is freely reciprocable within the chamber 82a–84a and is inserted therein from the rearward side of head component 64. The arrayed bores for the marker pins are enclosed by an annular cover plate 98. Bores extend through the cover plate 98 in conjunction with each of the marker pins as at 88a. FIG. 4 shows bore 100a extending through cover plate 98 and threadably containing a pneumatic coupling, for example represented at 102. Air under pressure admitted through coupling 102 serves to drive the marker pin assemblage 86 forwardly to cause impacting tip 96a to form a pixel indentation in the surface to be marked as at 26 (FIG 2). Pin 86a is returned to its stand-by position by a return air input which is continuously asserted at the forward end of chamber 82a, for example through bow or conduit 104a. The pressure of return air asserted from bore 104a is less than the drive pressure of air asserted through coupling 102 and, preferably, will carry a lubricant. It may be observed that the necked down portion 92a is developed so that drive portion 90a is in a proper orientation during such time as a full extension of the shaft portion 94a may be experienced, such that the return air will return the pin assembly to its standby rearward position. Return air under pressure is introduced to bores as at 104a from drive shaft 68 through a centrally disposed bore 106 extending therethrough. Bore 106 is seen to extend to an air distribution recess 108 through feeder bores as at 110. Recess 108 is seen to be in pneumatic communication with return air bores as at 104a.

Figure 6:
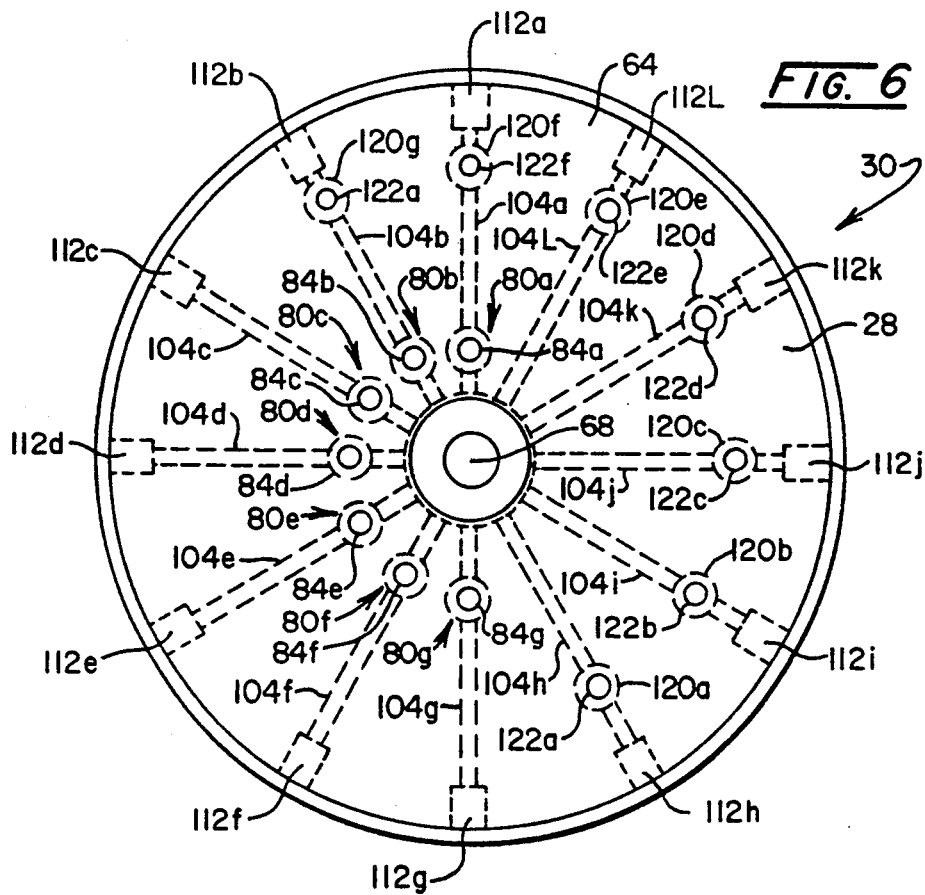
FIG. 6 is a plan view of a head component of the apparatus of FIG. 1 looking into the confronting portion thereof.

Looking to FIG. 6, a front view of head component 64 is revealed, the chamber bores 82a and 94a being shown within an array of such chambers represented, for example, by chamber portions 80a–80g or 84a–84g. The corresponding feeder bores for those chamber components are shown, respectively, at 104a–104g which, in turn, extend to threaded openings as at 112a–112g within which threaded plugs are inserted (not shown).

A second array of marker pin assemblies may be employed within head component 64 as represented by the counterbored chambers including rearwardly disposed bores 120a–120g and forwardly disposed shaft retaining bores shown, respectively, at 122a–122g. The latter bores are seen to be bored along centrally disposed axes which are at larger radial distances from marker axis 66. Additionally, each, from first to last, is at an incrementally lesser radial distance to define arcuate locii representing the rows of pixels within the unique pixel matrix wherein characters may be developed according to the invention. Note additionally in FIG. 6, that the axes of the bores for the marker pin assemblies are arranged in equal radial increments for each of the marker pin array chambers shown. This angular spacing may, for example, be shown at angle α which may be 30°. Certain of the feeder bores, for example as at 104a and 104b are developed in common to supply return air to both arrays of marker pin assemblies. Additional feeder bores are shown at 104h–104l to provide return air inputs to chambers as shown, respectively, at 120g, 120f, 120e, 120d, and 120c.

Figure 7:
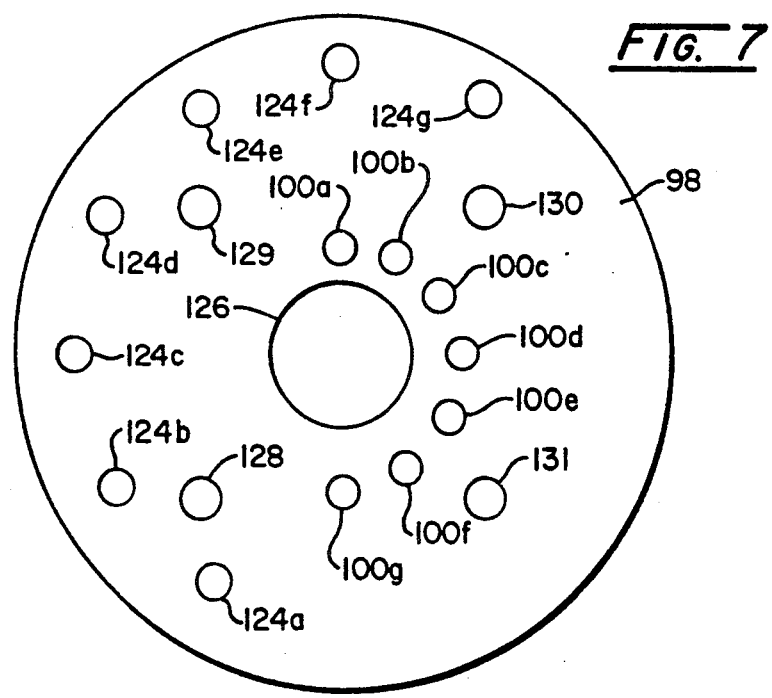
FIG. 7 is a plan view of a cover plate employed with the head assembly of the apparatus of FIG. 1.

Turning to FIG. 7, a plan view of the cover plate 98 is revealed showing the rearwardly disposed ports formed therein as suited for connection with pneumatic couplings as at 102. In this regard, the inwardly disposed array marker pin assemblies are pneumatically fed through pneumatic couplings as at 102 through threaded bores as at 100a–100g. Correspondingly, the threaded bores for providing this same function for the outer array of marker pin assemblies are represented at 124a–124g. A central bore is provided at 126 for permitting passage of the drive shaft 68 therethrough and the cover plate 98 is affixed to head component 64 by machine screws extending into component 64 through bores as represented at 128–131.

Returning to FIG. 1 and looking, additionally, to FIG. 3, the pneumatic coupling 102 associated with each of the marker pin assemblies of the arrays thereof within head component 64 are coupled with an array 136 of polymeric, flexible pneumatic tubes or conduits. The tubes of this array 136 carry pneumatically derived pulses for driving each of the marker pins within the marker pin assemblies, for example at 80a–80g. Accordingly, the pneumatic pulse actuating input conduits within the array 136 are seen being directed to an adjacently located pneumatic drive assembly shown generally at 138. Assembly 138 is modular in its design, including a drive assembly manifold 140 which is secured, in turn, to an L-shaped bracket 142 (FIG. 5) fixed, in turn, to base 12. The outputs of manifold 140 are coupled to the tubes within array 136 and may, additionally, be coupled to a second array of seven such pneumatic pulse carrying tubes (not shown). Such outputs additionally, are coupled to arrays of electromagnetic actuated or solenoid driven valve assemblies, an uppermost such assembly being shown, in general, at 144 and a lower disposed such assembly being shown in general at 146. Upper array 144, the array utilized for the instant embodiment, incorporates seven solenoid drive valve assemblies 148a–148g which are bolted to the drive assembly manifold 140, inter alia, by an array of paired bolts 150 at the forwardly disposed portion of the device. In similar fashion, an array of paired bolts 152 secure the lower array of solenoid actuated valves 146 to manifold 140. A high pressure air supply conduit 154 is seen extending to the chamber of manifold 140 from a connection (not shown) within pneumatic service. Valve assemblies such as at 148a–148g may be provided, for example, as those marketed by the Mac Valve Corporation, Detroit, Mich. Manifold 140 includes an elongate chamber (not shown) associated in common with each of the arrays 144 and 146. This chamber supplies air under pressure to the inputs of the solenoid actuated valve within those arrays and is configured of a size effective to substantially eliminate degradation of performance of the market pin assemblies of the arrays to which it is coupled. In this regard, earlier devices typically employed long drill ports with small cross-ports leading to individual valves to carry actuating pressurized air. When these valves were actuated utilizing a source of air under pressure not from a common and specifically designed chamber, performance tended to degrade in the event of simultaneous actuation of the pin assemblies. The manifold designed is described in detail in earlier referenced U.S. Pat. No. 5,015,016.

FIGS. 1 and 3 reveal the orientation of marker head 30 wherein a rotational marking procedure is essentially completed. In this regard, note that the array 136 of flexible pneumatic conduits has wound about drive shaft 68. Following completion of rotational movement, the head 30 is driven in reverse to its original starting position wherein the array of tubing 136 is unwound from shaft 68.

Rotational motion is imparted to the head assembly 30 from drive shaft 68 by a d.c. servo motor 160 which is seen in FIGS. 1 and 3 as being supported at an elevated position by an upstanding drive base 162 fixed, in turn, to a slot 164 within base 12 (FIG. 1).

Figure 8:
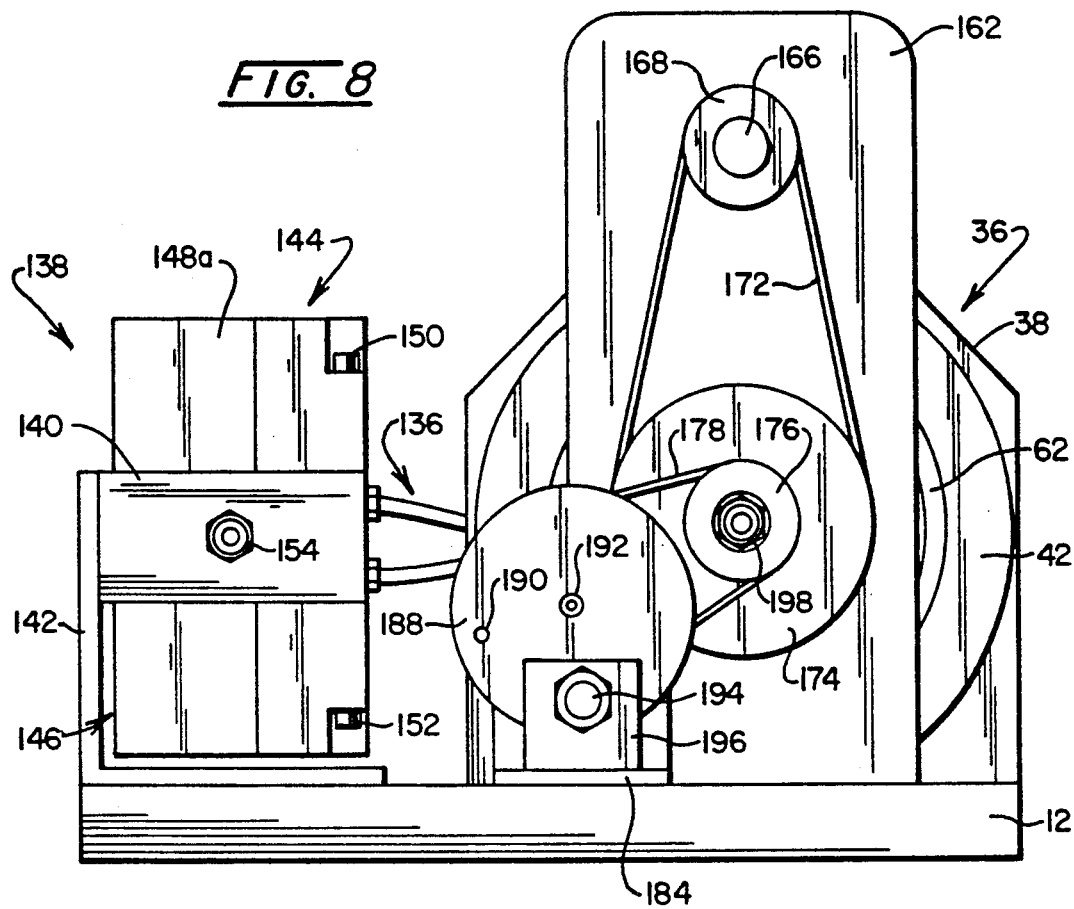
FIG. 8 is a rear view of the apparatus of FIG. 1.

Motor 160 provides a gear reduced output a shaft 166 and pulley 168. The motor may, for example, be provided as a device sold under the trade designation "Gear Motor" by Pittman Corporation, Model No. GM9413 having a ratio of 65.5 to 1 Motor 160 also is configured incorporating an encoder 170 coupled to the opposite end thereof. Encoder 170 serves to provide positional outputs representing the angular orientation of shaft 166 and serves to generate control inputs representing pixel location of the matrix within which characters are formed by the apparatus 10. Pulley 168 is configured having teeth (not shown) and is associated in driving relationship with a gear belt 172, which, in turn, is coupled in driving relationship with a gear belt pulley 174 fixed, in turn, to shaft 68. Thus, dual directional rotational movement is imparted through the shaft 68 to the head assembly 30. Looking to FIGS. 3 and 8, to track this dual directional rotational movement on the part of shaft 68, a gear belt pulley 176 is coupled thereto outwardly of pulley 174. Pulley 176 is coupled in driving relationship through a gear belt 178 to a gear belt pulley 180 (FIG. 3) which is mounted upon a shaft 182 bolted to an L-shaped bracket 184. Bracket 184, in turn, is fixed by machine screw 186 (FIG. 1) to base 12. FIGS. 3 and 8, reveal a timing disk 188 having an opening therein 190 and fixed to shaft 182 by bolt 192 (FIG. 8). Positioned to detect the presence of opening 190 at its lowermost orientation is a magnetic proximity detector 194 which is supported, in turn, by a plate 196 extending from L-shaped bracket 184. Proximity detector 194 provides an "away" signal which is employed in conjunction with the output of encoder 170 to provide a timing and positioning input to the control arrangement operating apparatus 10.

FIGS. 1 and 3 additionally show a pneumatic coupling 198 which functions to provide an intercoupling between the return air conduit 106 within drive shaft 68 and a supply of return air which is provided from flexible tubing 200. As noted above, this pneumatic drive functions to return the marker pins as at 80a–80g to their retracted or stand-by orientation.

Figure 9:
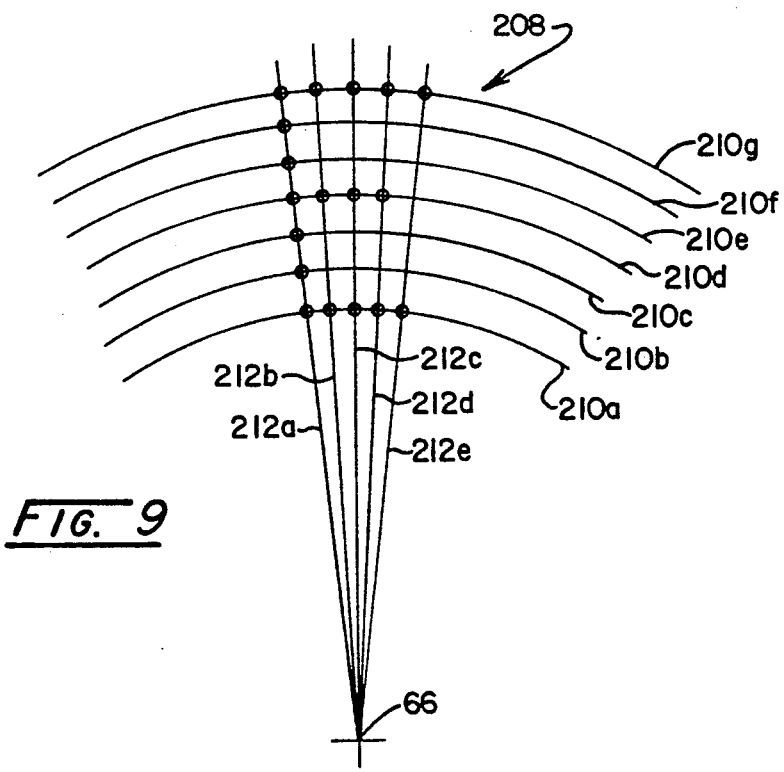
FIG. 9 is a schematic representation of a pixel matrix formed in accordance with the method of the invention and showing a character formed therein.

Looking to FIG. 9, a representation of the character "E" as formed utilizing the radii-arc pixel matrix is revealed at 208. To form this character, which is readily man readable, the marker pins of the array, for example at 80a–80g move with the head assembly 30 along arcuate locii herein represented respectively at 210a–210g. The marker pins are spaced apart in regular increments from first to last such that the corresponding locii as 210a–210g are equally spaced. Columns within the pixel matrix are defined by radii as at 212a–212e emanating from marking axis 66. In general, the position of each pixel int he matrix employed to form a character such as that at 208 is generated by the encoder 170 in correspondence with the angular orientation of the radii 212a–212e. Because the surface to be marked 26 (FIG. 2) may receive a full 360° of character marking, it is necessary that the terminal signal as developed by the opening 190 operating in conjunction with proximity detector 194 perform such that the head assembly 30 is capable of rotating an angular extent greater than 360°. This permits all marker pins within an array thereof to pass the last radial position of the last pixel matrix formed in a message. To assure such capability, the turns ratio between gear belt pulley 176 and gear belt pulley 180 (FIG. 3) is selected so that disk 188 turns more slowly than the drive shaft 68. In particular, the coupling therebetween is provided such that the coupling of the timing disk 180 with the drive shaft 68 effects a turns ratio respectively between the shaft 68 and the disk 180 of 1:x, where x is a value less than 1. Typically, the value x will be 0.5.

The arrays of seven marker pin assemblies described earlier herein, for example, at 80a-80g as well as, for example, in conjunction with FIG. 6 at chamber bores 120a-120g have represented discrete arrays spaced apart by a given radius representing the median position of a pixel matrix. A multiple pin singular array in effect, representing more than one seven pin assembly may be provided as a continuous spiral such that, for example, the operator of apparatus 10 may select a given sequence of seven marker head pin positions of selected average radius. Such a continuous array is revealed in FIG. 5 at 214.

Figure 10:
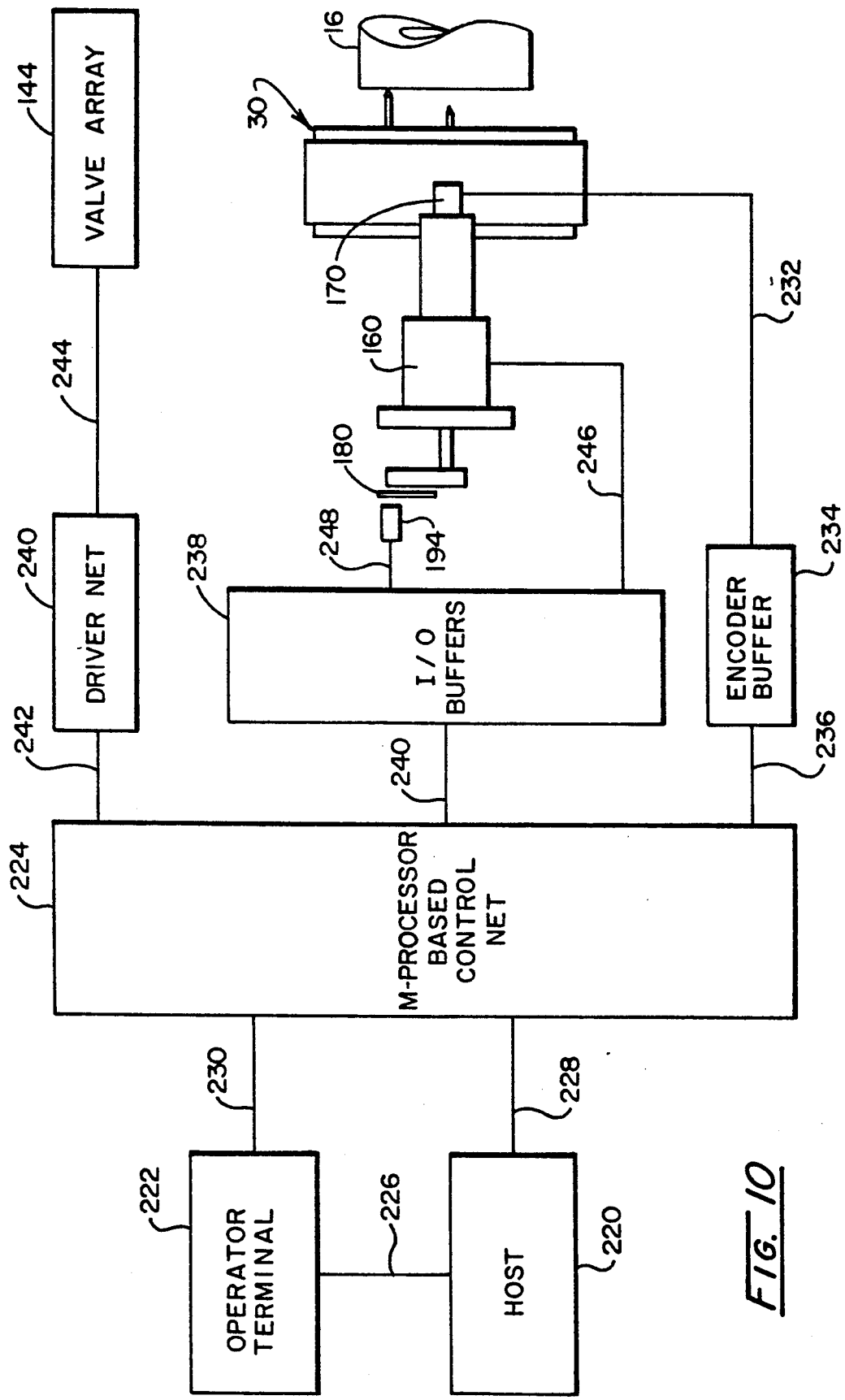
FIG. 10 is a schematic diagram of a control system which may be utilized in conjunction with the apparatus of FIG. 1.

Referring to FIG. 10, a schematic representation of a control circuit utilized in conjunction with the apparatus 10 is set forth. Where appropriate the elements of apparatus 10 discussed hereinabove are shown in schematic form with the same identifying numeration.

The control apparatus 10 may be accessed from a general computer facility and/or through an operator terminal. This approach is represented in the figure by respective blocks 220 and 222. Generally, input to the microprocessor driven control system as represented at block 224 is provided in conventional serial fashion through the utilization of RS232 interfacing. Direct access of either of these functions to the processor base control network 224 is represented at lines 228 and 230. The microprocessor based control system represented at block 224 utilizes a type 8085 central processing unit (CPU) running at 8 MHz. The device utilizes a type DS1216 random access memory incorporating a smart watch clock and exhibiting a memory of 8K ×8 capacity. Additionally, at 16K EPROM instructional storage capacity is provided, for example, as an EPROM of type 27128A. The control system further will include a pair of type 8155-2 counter-timers which are utilized for the purpose of developing periodic interrupt signals as a consequence of the signal treatment of the output of encoder 170. In the instant figure, the output of encoder 170 is represented at line 232 as extending through a signal conditioner or encoder buffer represented at block 234 which may be provided as a type 74LS14 device. The output of this buffer is shown extending to network 224 is represented by line 236. The serial input of character data as represented at lines 228 and 230 to the control network 224 may be provided through utilization of universal asynchronous receiver transmitter (UART) which may be provided as a type 2651. The input/output network for the system is represented at block 238 and 240. Drive to the solenoid actuated valves, for example at array 144, is provided by a driver function represented at block 240. Control network 224 is represented by line 242. The output of the driver network is represented at line 244. Control to motor 160 is represented at line 246, while the terminal position indication derived from disk 180 and encoder 194 is shown submitted to the input/output function via line 248.

Generally, a message formed upon the workpiece 16 surface 26 is received in serial data form utilizing an ASCII format in which serialized data are then converted to multi-bit parallel format by the input/output function of the control system. The message generally will show an end position through the use of a symbol such as a carriage return (CR) and will be accompanied by a print command signal. In general, the character data are retained in random access memory which may be accessed in a dual directional fashion depending upon the direction of relative movement between the head 30 and the workpiece 16. The resultant information provided in RAM is converted to a solenoid valve actuation select signal which is directed to a message image storage memory function in conjunction with a synchronization of the output signals appropriately treated from encoder 170. In considering the pixel spacings involved for the selected matrix structure, an integer relationship preferably exists between marker pin spacings and the pixel component spacing forming each character. This permits a facile digital processing of data. By selectively adjusting the division of encoder input pulses, the letter characters also may themselves be slanted such that a capability exits for the system to create what, in effect, is an italicized character component.

Turning to FIG. 11, a general flow diagram describing the instructions under which the control network 224 performs is revealed. Following a program start as represented at block 260, initialization procedures are carried out as represented at block 262. Upon such initialization, as represented at block 264, the ASCII message is procured. Upon procuring the message, as represented at block 266, the parameters for printing and compiling the message are procured, such parameters being evolved from switching inputs and the like. With these parameters acquired, as represented at block 268, a compilation sub-routine is carried out and the data are appropriately treated for submittal to temporary memory generally referred to as "image" memory. As represented at block 270, the program then awaits a print command, whether derived from the operator, a host computer, or sensing device. In the event that the print command has not been received, the program loops as represented by loop line 272 until such command is received. Upon receipt of the command, the program then enters a printing or publication function as represented at block 274 wherein the marker pin assemblages within the head function 70 are actuated to carry out publication of the message. The interrupt function of the microprocessor component of network 227 is utilized for receipt of the encoder derived clocking signals. The print routine also will be affected by any signals aborting a message or representing a pin failure or the like. Following the carrying out of printing, as represented at loop line 276, the program acquires a next ASCII message as represented at block 264.

Figure 12A:
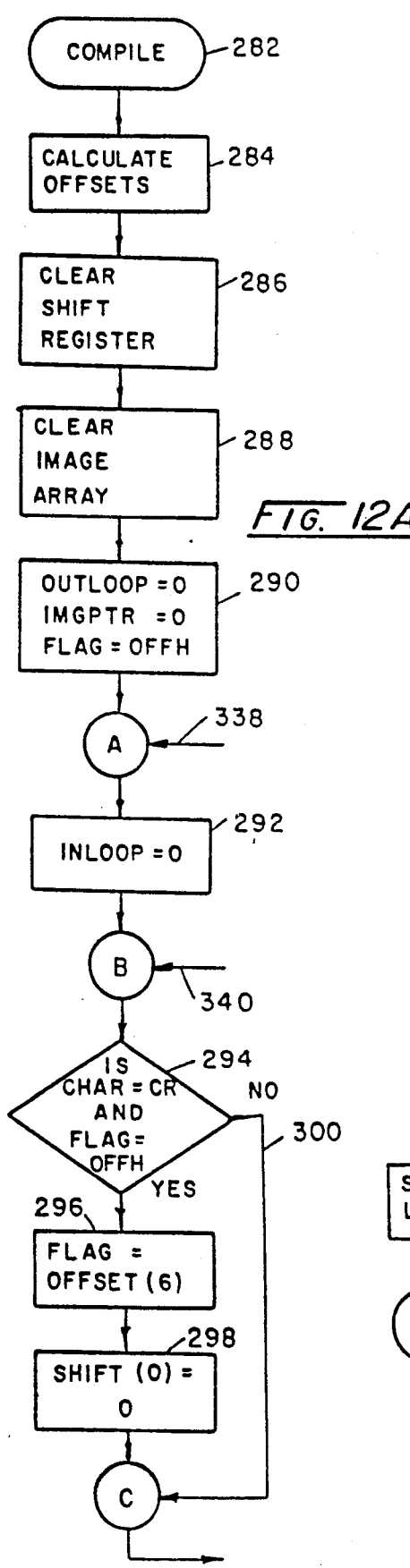
FIGS. 12A-12C are a flow diagram describing an image compiler routine employed in conjunction with the control system of FIG. 10.
Figure 12B:
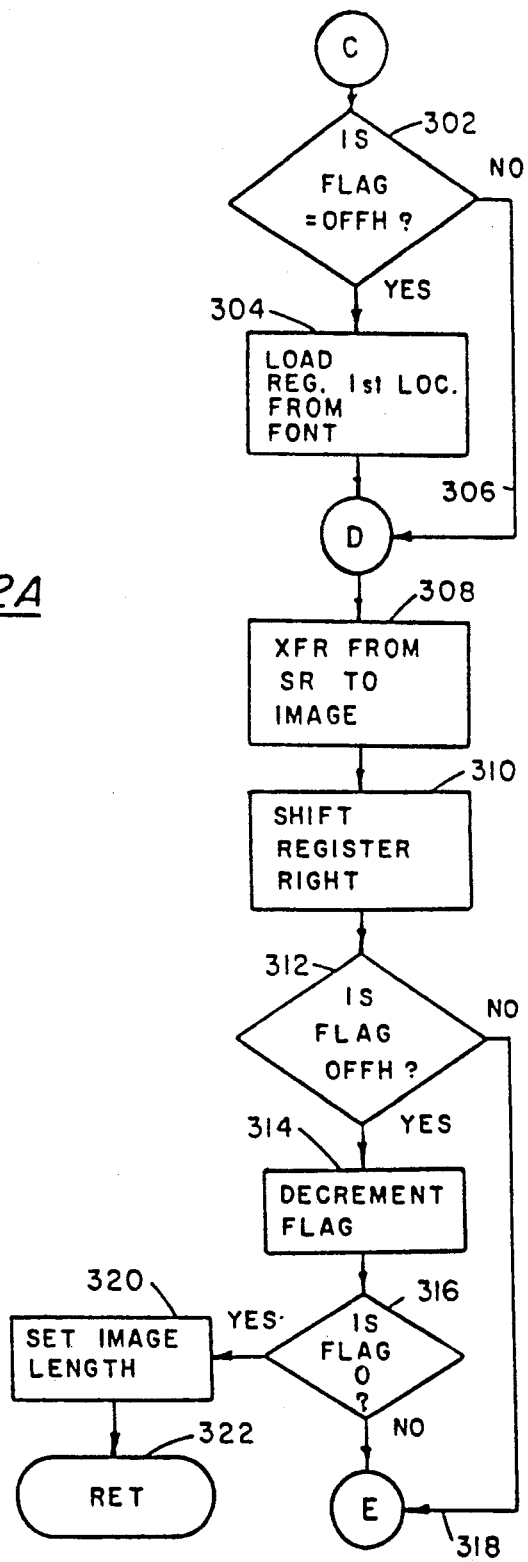
Figure 12C:
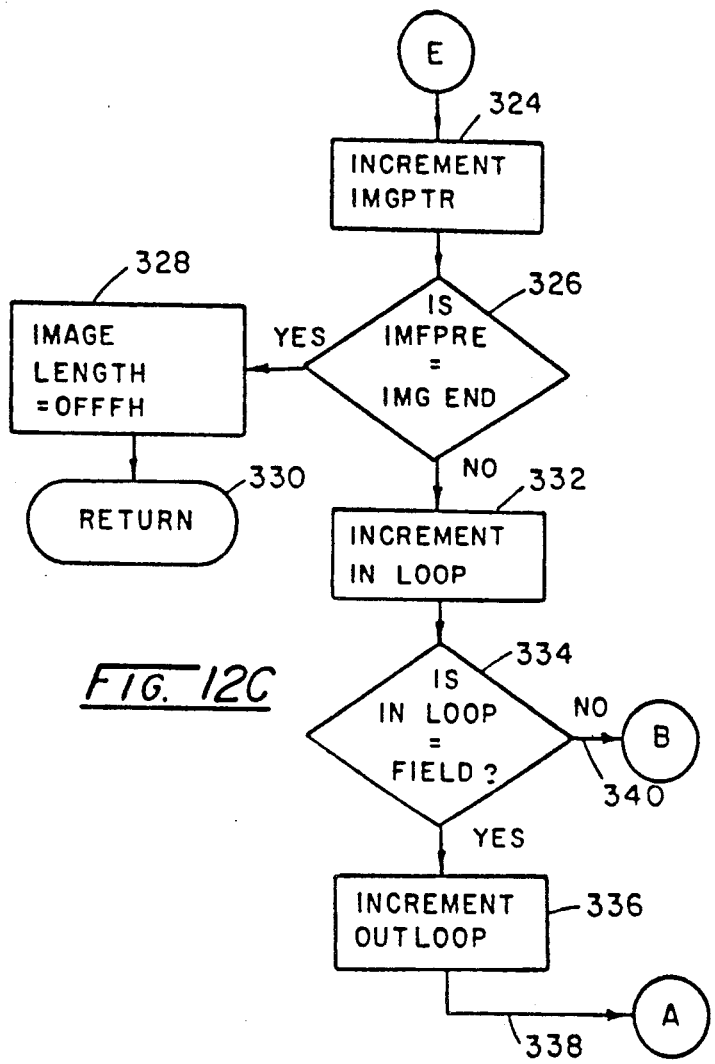

Referring to FIGS. 12A-12C, the compile sub-routine discussed in conjunction with block 268 is revealed at an enhanced level of detail. This sub-routine serves to convert an operator or host computer entered message to the image data which are stored in random access memory and from which printing instructions are removed. A compile routine treatment and submission of the data to the image storage function is done for a complete message before printing takes place. Thus, as indicated earlier, the message may be withdrawn from the memory for printing purposes from either side of memory, making the direction of rotation of the head assembly 30 optional to, for example, facilitate marking production rates by eliminating the requirement of rotating the head to its home position prior to commencing the formation of a message on a workpiece. The compile sub-routine is shown entered at block 282 and, as the routine is entered, an address is received from a calling routine which points to a block of data showing the commencement of the ASCII message, storage position for the image array within RAM, the size of memory available, the integer value for pixel spacing and field data. In the latter regard, the field information is a single byte indicating the width of a character and the number of spaces elected between individual characters. Generally, for a 5×7 matrix, the width will be five pixel locations plus a character spacing or the value 6. Where small letter are used, however, for example, an "i", a smaller field may be programmed. The information collected also includes a pointer to a font table or image look-up table. Other data may be accessed depending upon the particular function of the marking desired. The compile routine then progresses to the instructions at block 284 where offsets are calculated which look to the integer pixel spacing, for example, for a pixel integer count of 3, register locations may be at integers 0, 3, 6, 9, etc. Generally, seven offsets are utilized for a 5×7 matrix. The subroutine then progresses to the instructions represented at block 286 at which position directions are provided for clearing the register function to assure that no spurious signals are present therein. Next, as represented at block 288, the image array or data stored for transfer to the printing function are cleared. Following the above, as represented at block 290, an out loop counter is initialized at a zero value, an image pointer similarly is positioned to show the location for storage in image memory, and a flag is set to the value OFFH which is utilized to provide termination information. The out loop function is executed for every character in the ASCII message as well as for a predetermined number of times following a message to assure clearance of register functions. In effect, the out loop functions to identify the character and message being decoded and is utilized in calculation to determine where data are to be stored in image memory.

Upon completing the above initialization procedures, as represented at block 292, a next count or pointer function identified as "in loop" is initialized at a zero value. The in loop variable increments to identify the pixel components of a given character, as opposed to the out loop function of monitoring actual character presentation. Accordingly, the routine looks to the query represented at block 294 wherein a determination is made as to whether a carriage return has been received representing an end of message and further, whether the above-discussed flag representing a message termination retains the inserted value of OFFH. In the event that the conditions so represented are true, then the message is at an end and the routine progresses to block 296 wherein the offset value for the register function is set to show the extent of register function actually being utilized. Additionally, as represented at block 298, the zero location of the register function is set at zero. In the event the condition presented at block 294 is negative, then as represented by loop line 300 leading to node C, the program considers the condition posed at block 302. Looking to FIG. 12B, and node C, block 302 provides an inquiry as to whether the flag value remains at OFFH and in the event that it does remain at that value, then the message is not ended. Accordingly, as represented at block 304, the first location in the register function is loaded form the font or image lookup table. In the event of a negative response to the query at block 302 as represented at line 306 and node D, or following the loading of the register function first location, the program then transfer data from the registers function to image memory as represented at block 308. Following such transfer, the register function is shifted to the next higher level as represented at block 310. Following this data maneuver, as represented at block 312, a determination is made as to whether the message continues to examining whether the flag value is less than OFFH. If that is the case, then as represented at block 314, the flag is decremented by one value and, as represented at block 316, a determination is made as to whether the flag value has reached zero. Where the inquiry at block 312 results in a negative response, then a message continuation is indicated and the program advances as represented at line 318 leading to node E. Where the inquiry at block 316 is in the affirmative, then a carriage return or the like will have been received by the system and the routine is exited. However, as represented at block 320, an indication as to the extent of the image memory utilized is established as represented by the instructions to set the image length. From block 320, the program returns to the calling program as represented at block 322.

Where the flag value is not at zero or the flag is not less than OFFH, then as represented at block 324 in FIG. 12C, the pointer for the image memory is incremented by 1 such that it now points to the next location in image memory. From block 324, the routine progresses to the query at block 326 at which a position a determination is made as to whether the image pointer is at the end of the message memory. If so, a message will have been compiled which is of greater extent than memory capacity. Accordingly, as represented at block 328, a very large image length is set and the routine returns to the calling programs as represented at block 330. Where the inquiry at block 326 shows a negative response, then as represented at block 332, the in loop counter is incremented by a value of 1. The routine then inquires as represented at block 334 as to whether the in loop valuation is equivalent to the field value, the latter representing the length of the character being treated. In the event that en equivalence is present, the last location for a given character will have been accessed and as represented at block 336 the outer loop is incremented and as represented at line 338 and node A in FIG. 12A, the program returns to block 292. Where the inquiry at block 334 results in a negative response, then the interloop condition is continuing and as represented at line 340, the program returns to node B and block 294 as shown in FIG. 12A.

Referring to FIGS. 13A–13D, the print routine as discussed generally in conjunction with block 274 is set out in enhanced detail. This routine is shown to be entered at terminal 350 from which position an initialization procedure is carried out which determines essentially the number of repetitions which are to be made of given message. Initially, however, as represented at block 352, the divider function for dividing the pulse output of encoder 170 is set to a desired value. It may be recalled that this division function may be programmable and the degree of division carried out may be varied depending upon the type of characters which it is desired to publish.

Figure 13C:
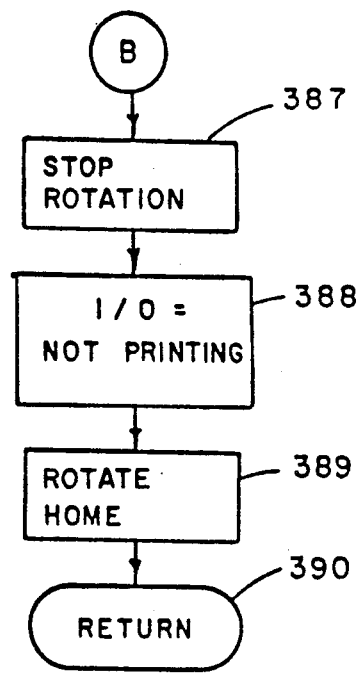
FIGS. 13A-13D are a flow diagram of a print routine utilized in conjunction with the control system of FIG. 10.
Figure 13A:
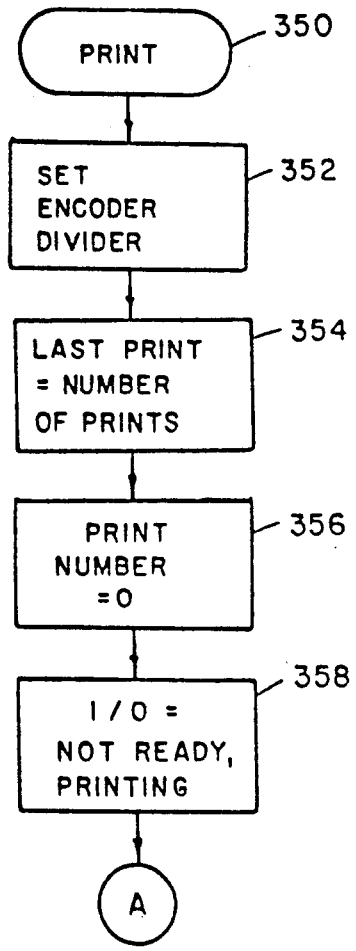
Figure 13D:
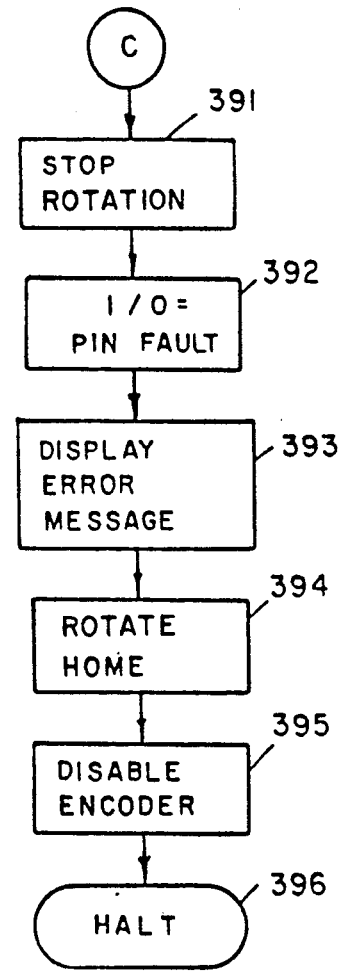
Figure 13B:
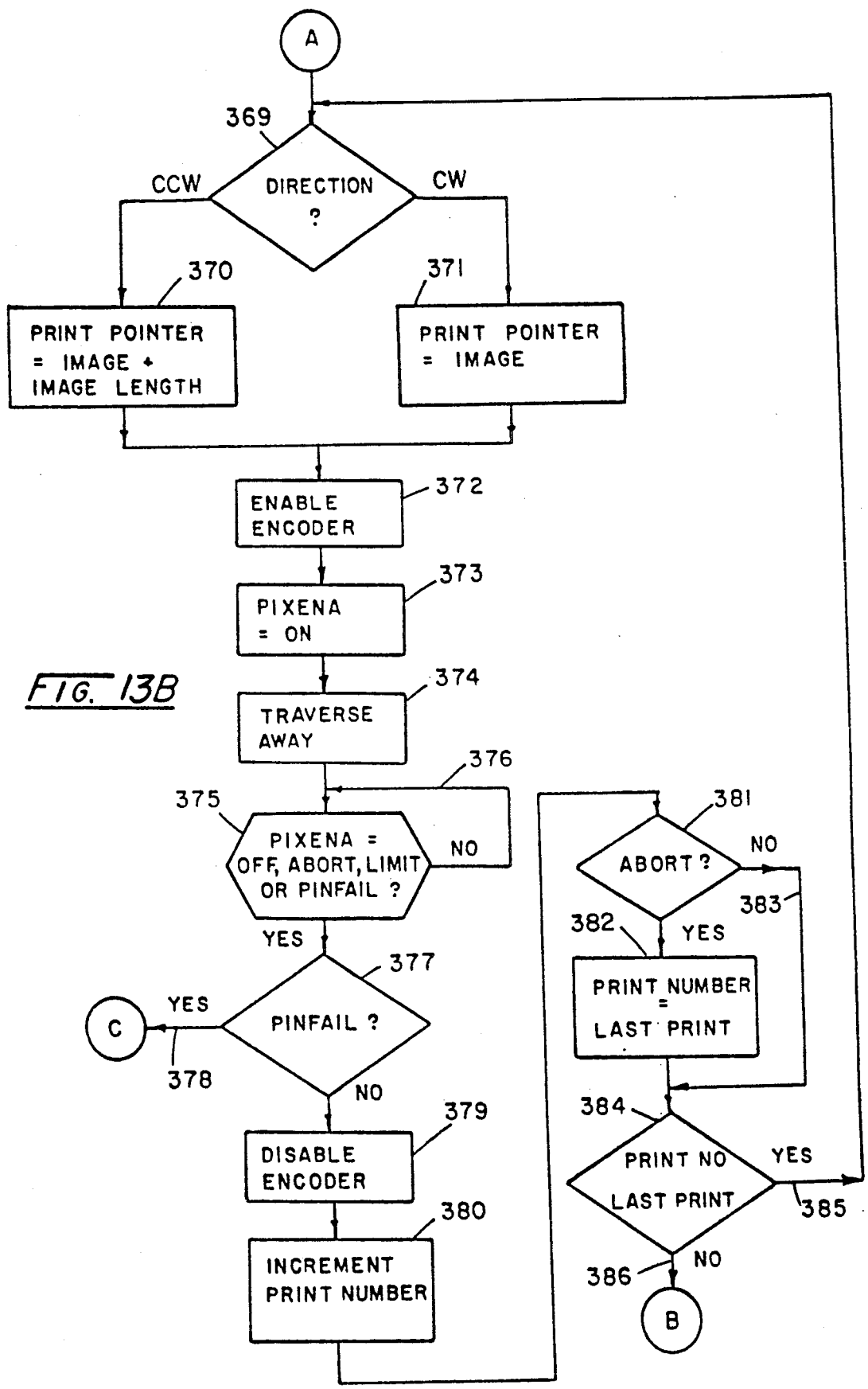

The routine then looks to setting the number of prints desired as represented at block 354, upon which is then progresses to block 356 where a print number counter is initialized at value 0. The program them looks to the next instruction at block 358 wherein an output message is generated indicating that the system is not ready to accept further messages during the printing procedure. The initialization procedures are completed at this juncture and the routine progresses as represented by node A to the inquiry at block 369 as shown in FIG. 13B. Block 369 provides for a determination, in the event of dual directional printing for head assembly 30 as to the appropriate direction of rotation of printing purposes. For this purpose, the arbitrary designations of counter-clockwise (CCW) and clockwise (CW) are provided, a counter-clockwise direction indication leading to block 370 wherein the print pointer operating in conjunction with message memory is positioned at the location of image plus image length. On the other hand, where the designated rotational direction is clockwise, then as represented at block 371, the print pointer is located at the image position. The program then proceeds to the instructions at block 372 at which position the pulsed output of encoder 170 is enables. In effect, the interrupt function of the microprocessor component of the control is enabled with this instruction. The program then proceeds to block 373 wherein a pixel enable flag is turned on to represent a condition wherein a byte of data will not have ben sent to the solenoid value array for marker pin assembly actuation. The program then proceeds to the instructions at block 374 wherein an I/O port is set to permit instructions to cause the head assemblage 30 to commence to rotate.

At this juncture, the routine looks for any condition wherein printing should be halted. For example, the pixel enable flag may be turned off, an abort signal may be received from the operator or host terminal, the limit of rotation as detected by encoder 194 (FIG. 1) or, where such feature is provided, a failure due to a broken marker pin or the like may have been encountered. Loop line 376 extending from block 375 represents that a monitoring of these potential conditions takes place throughout a print. Where one of the conditions set forth in block 375 is at hand, then as represented at block 377, a determination is made as to whether a pin failure has occurred. In the event that it has, then a pin failure sub-routine is carried out as represented at line 378 leading to node C. Where a pin failure is not indicated, then the routine proceeds to the instruction at block 379 wherein the program disables encoder 170. In effect, no further interrupt signals will be recognized. The pin failure routine is described in the above-referenced patent entitled "Program Controlled Pin Matrix Embossing Apparatus by Robertson, U.S. Pat. No. 4,506,999, which is incorporated herein by reference. The program then proceeds to the instructions at block 380 at which position the print number counter is incremented by 1. Upon such incrementation, as represented at block 381, a determination is made as to whether the operator or host computer has aborted the print. In the event that is the case, then as represented at block 382, the current print number is made equal to the last message print number to affect a program termination. Where the inquiry at block 381 is in the negative, then as represented by line 383, the routine progresses to the inquiry represented at block 384. This inquiry determines whether the current print number is less than the value of the last print number. In the event of an affirmative response, as represented by loop line 385, the routine proceeds to node A for re-execution. Where the inquiry at block 384 is in the negative, then as represented at line 386 and node B, the sub-routine proceeds to a termination routine as represented at node B in FIG. 13C. Referring to that figure, as represented at block 387, with the printing of the last message, an instruction to turn off the head 30 drive bit is made as represented by the command "STOP ROTATION". The program then proceeds to the instructions at block 388 at which position a command is provided to set the appropriate I/O command or bit to a condition not to provide print output signals. As represented at block 389, a command then is provided to cause the head assembly 30 to rotate to its original or "home" position. As shown at terminal 390, the routine then returns to the calling program.

As described in connection with block 377 in FIG. 13B, in the event of a broken marker pin, the routine diverts to a pin failure sub-routine as described in conjunction with FIG. 15D. As noted above, where such a broken pin detection scheme is provided, then this program is pertinent. Looking to FIG. 13D, the first command of this routine as represented at block 391 is to stop the rotation of head assembly 30. Next, as represented at block 392, the input/output pin fault output is set to a true condition which may be utilized to provide any form of visible or audible indicia of such fault condition. In the event that a visual output is provided for the operator as through a CRT device or the like, as represented at block 394, the head assembly 30 then is caused to rotate to its home or initial position. This instruction may be provided optionally in accordance with the wishes of the user. The sub-routine then looks to the instructions at block 395 wherein the output of encoder 170 is not recognized by the control function and, as represented at terminal 396, the system enters a halt condition.

Since certain changes may be made in the above-described apparatus and method without departing from the scope of the invention herein involved, it is intended that all matter contained in the description thereof or shown in the accompanying drawings shall be interpreted as illustrative and not in a limiting sense.

I claim:

1. Apparatus for marking solid material objects at a surface thereof in response to data inputs with a sequence of indentation defined characters, each within a pixel matrix comprising:
   a marker head rotatable about a marking axis and having a confronting portion positionable in spaced adjacency with the surface of an object to be marked, including an array of marker pin assemblies, each positioned a unique radial distance from said axis and each located along a predetermined radius extending from said axis, each said marker pin assembly including a marker pin having an impacting tip drivably movable from said confronting portion into said surface when actuated in response to control signals;
   a support retaining said marker head for rotational movement about said axis;
   drive means coupled with said marker head for effecting the rotation thereof about said axis to move said marker pin assemblies along unique, mutually spaced arcuate locii representing arcuate rows within a pixel matrix; and
   control means responsive to data inputs for acquiring print and compile parameters and compiling said data inputs with respect thereto for deriving control signals to actuate said marker pins to form characters within said matrix arcuate rows and at column pixel locations of said matrix wherein each said column is represented along a unique radius extending from said axis.

2. The apparatus of claim 1 in which said marker pin assemblies are located in said array from first to last, each at a said unique radial distance from said marking axis corresponding with a selected pixel row location within said pixel matrix.

3. The apparatus of claim 2 in which said unique radial distance of each said marker pin assembly increases in equal radial increments from said first to last marker pins within said array.

4. The apparatus of claim 1 in which each said predetermined radius locating a said marker pin assembly is angularly displaced from a next adjacent said predetermined radius by a constant angular value.

5. The apparatus of claim 1 in which said marker head comprises:
a rotatable head component having said confronting portion as a confronting surface arranged normally to said marking axis, a rearward portion and a cylindrically shaped periphery therebetween; and
said array of marker pin assemblies comprises:
an array of chambers, each extending interiorly from an opening at said confronting surface, a said marker pin being mounted for reciprocation within each said chamber and having a drive portion and a shaft portion depending therefrom and extending to a said impacting tip and drivably extensible through an associated said opening in response to conveyed pneumatic drive pulses;
an array of pneumatic drive input ports, each extending from said rearward portion to one said chamber for providing pneumatic drive input to the rearward side of a said marker pin drive portion therewithin; and
a pneumatic return connectable with a supply of gas under pressure and extending from a return input to each said chamber for conveying pneumatic return drive to each said chamber forwardly of said drive portion of a marker pin therewithin.

6. The apparatus of claim 5 in which said control means comprises:
valve means having a pneumatic input connectable with a supply of gas under pressure and selectively actuatable to provide said control signals as pneumatic pulses at a plurality of output ports;
circuit means responsive to said data inputs for effecting said select actuation of said valve means; and
flexible conduit means coupled between said valve means output ports and said array of pneumatic drive input ports.

7. The apparatus of claim 5 in which:
said drive means includes a drive shaft coupled in driving relationship with said head component and having a central axis co-axially disposed with said marking axis; and
said pneumatic return extends co-axially with said drive shaft to said head component.

8. The method for marking solid material objects at a surface thereof in response to data inputs with an arcuately disposed sequence of indentation defined characters, each within a pixel matrix, comprising the steps of:
providing a marker head having a marking axis and a confronting portion located in spaced adjacency with said surface;
providing an array of marker pins from first to last within said marker head each positioned a unique radial distance from said marking axis, each located along a predetermined radius extending from said marking axis, and having an impacting tip movable from said confronting portion, when actuated, into said surface;
effecting relative rotation motion between said marker head and said surface about said marking axis to effect corresponding relative motion between said marker pin impacting tips and said surface along respective unique arcuate locii representing arcuate rows of said matrix;
acquiring print and compile parameters and compiling said data inputs with respect thereto; and
actuating said marker pins in correspondence with said compiled data outputs to form select said indentations along said arcuate locii to form said characters within a said matrix comprised of said arcuate rows and having corresponding columns along radii extending from said marking axis.

9. The method of claim 8 in which said relative motion is carried out by rotating said marker head.

10. The method of claim 9 including the steps of:
providing an array of valves from first to last connectable with a source of gas under pressure, each being actuable to produce a pulse of said gas;
providing an array of flexible gas conduits from first to last coupled in gas transfer relationship respectively between said first to last valves and said first to last maker pins; and
said step of actuating said marker pins being carried out by selectively actuating said valves.

11. The method of claim 9 in which said marker head is rotated between first and second orientations to effect formation of a predetermined sequence of said characters upon said surface, and is rotated from said second to said first position subsequent thereto.

12. Apparatus for making solid material objects at a surface thereof in response to data inputs with a sequence of indentation defined characters, each within a pixel matrix of columns and rows, comprising:
a marker head having a marking axis, a confronting portion positionable in spaced adjacency with the surface of an object to be marked and including an array of marking pin assemblies, each positioned a unique radial distance from said marking axis and each located along a predetermined unique radius extending from said marking axis, each said marker pin assembly having an impacting tip drivably movable from said confronting portion into said surface in response to control signals;
drive means for effecting relative rotational movement between said marker head and said surface about said axis to effect corresponding relative motion between said marker pin assembly impacting tips and said surface defining unique, mutually spaced arcuate locii representing arcuate rows within a pixel matrix; and
control means responsive to data inputs for acquiring print and compile parameters and compiling said data inputs with respect thereto for deriving said control signals to form indentation defined characters within said pixel matrix wherein each column of said matrix is represented along a radius extending from said marking axis.

13. The apparatus of claim 12 in which said marker pin assemblies are located in said array from first to last, each at a said unique radial distance from said marking axis corresponding with a selected pixel row location within said pixel matrix.

14. The apparatus of claim 13 in which said unique radial distance of each said marker pin assembly increases in equal radial increments from said first to last marker pin assemblies within said array.

15. The apparatus of claim 12 in which each said predetermined radius locating a said marker pin assembly in angularly displaced from a next adjacent said predetermined radius by a constant angular value.

16. Apparatus for marking solid material objects at a surface thereof in response to data inputs with a sequence of indentation defined characters, each within a pixel matrix comprising:

a marker head rotatable about a marking axis having a rotatable head component with a confronting portion including a confronting surface arranged normally to said marking axis and positionable in spaced adjacency with the surface of an object to be marked, a rearward portion and a cylindrically shaped periphery therebetween, said marker head including an array of marker pin assemblies, each positioned a unique radial distance from said axis and each located along a predetermined radius extending from said axis, each marker pin assembly including a marker pin having an impacting tip drivably movable from said confronting portion into said surface of an object to be marked when actuated in response to control signals, said array of marker pin assemblies comprising:

an array of chambers, each extending interiorly from an opening at said confronting surface, a said marker pin being mounted for reciprocation within each said chamber and having a drive portion and a shaft portion depending therefrom and extending to a said impacting tip and drivably extensible through an associated said opening in response to conveyed pneumatic drive pulses, an array of pneumatic drive input ports, each extending from said rearward portion to one said chamber for providing pneumatic drive input to the rearward side of a said marker pin drive portion therewithin, and a pneumatic return connectable with a supply of gas under pressure and extending from a return input to each chamber for conveying pneumatic return drive to each said chamber forwardly of said drive portion of a marker pin therewith;

a support retaining said marker head for rotational movement about said axis;

drive means coupled with said marker head for effecting the rotation thereof about said axis to move said marker pin assemblies along unique, mutually spaced arcuate locii representing arcuate rows of said matrix; and control means responsive to said data inputs for driving said control signals including timing means rotatably drivable in correspondence with said rotatable head component for deriving pixel position signals corresponding with said pixels of said matrix and a terminal signal representing one end of a predetermined sequence of said characters, said control means being responsive to said data inputs, said pixel position signals, and said terminal signal for deriving said control signals to actuate said marker pins to form characters within said matrix arcuate rows and at column pixel locations of said matrix wherein each column is represented along a unique radius extending from said axis.

17. The apparatus of claim 16 in which said support comprises:

a bearing housing having a bearing support portion extensible about the said cylindrically shaped periphery of said head component; and bearing means positioned intermediate said bearing support portion and said cylindrically shaped periphery for effecting the rotational support of said marker head.

18. The apparatus of claim 17 in which said drive means comprises:

a drive shaft coupled in rotational driving relationship with said head component and extending outwardly from said rearward portion to a support portion;

a drive base for rotatably supporting said drive shaft at said support portion; and motor means coupled in driving relationship with said drive shaft for effecting the rotation thereof.

19. The apparatus of claim 18 in which said control means includes timing means having a timing disk coupled in driven relationship with said drive shaft and a detector responsive to movement of said timing disk to a select orientation for deriving a terminal signal representing one end of a predetermined sequence of said characters.

20. The apparatus of claim 19 in which said coupling of said timing disk with said drive shaft effects a turns ratio respectively between said drive shaft and said disk of 1:x, where x is a value less than one.

* * * * *